United States Patent

Motegi et al.

[11] 3,976,866
[45] Aug. 24, 1976

[54] ADDITION CONTROL SYSTEM

[75] Inventors: Masanori Motegi; Keiichiro Uchida, both of Kawasaki; Minoru Koshino, Yokohama; Takatoshi Muraoka, Kyoto; Shigeru Nagasawa, Yokohama, all of Japan

[73] Assignee: Fujitsu Ltd., Kawasaki, Japan

[22] Filed: Sept. 2, 1975

[21] Appl. No.: 609,698

[30] Foreign Application Priority Data
Sept. 5, 1974 Japan............................ 49-102217

[52] U.S. Cl.................................. 235/168; 235/175
[51] Int. Cl.²........................................ G06F 7/385
[58] Field of Search........................... 235/168, 175

[56] References Cited
OTHER PUBLICATIONS
(S2765-0143) Anderson, R. B. 64–*Bit Adder,* In IBM Tech. Disc. Bull. 14(10): pp. 2939–2941, Mar. 1972.

*Primary Examiner*—R. Stephen Dildine, Jr.
*Attorney, Agent, or Firm*—Staas & Halsey

[57] ABSTRACT

A system for controlling the addition of signed binary numbers represented with N bits, of the 2's complement notation, is disclosed which includes addend and augend sign control circuits, and an adder circuit comprising a carry save adder and a carry proper gate adder. The addend sign control circuit receives an operation command sign signal (B, —B, |B| or —|B|) for the addend, which designates the addend of the certain type (B, |B| or —|—B|) to be applied directly to the carry save adder and designates the addend of another type (—B, |—B| or —|B|) to be applied to the carry save adder through a 1's complementer. The augend sign control circuit functions similarly for the augend being applied to the carry save adder. A corrective number (0, 1 or 2) is applied to the adder circuit which corresponds to neither, one, or both the addend and augend being applied to the adder circuit through their respective 1's complementer.

12 Claims, 10 Drawing Figures

(A)  　　　1 0 1 1
　　+) 　1 1 0 1
　　　1 1 1 0 0 0
　　　DISREGARD (B)  　1 1 1 0 1 1
　+) 　1 1 1 1 0 1
　　1 1 1 1 0 0 0
　　DISREGARD

0 0 0 1 0 1 ← 5
1 1 1 0 1 0 ← -5 1's COMPLEMENT 0 0 0 0 1 1 ← 3
1 1 1 1 0 0 ← -3 1's COMPLEMENT 1 1 1 0 1 0
　+) 　1 1 1 1 0 0
　1 1 1 0 1 1 0
　DISREGARD
　　　1 1 0 1 1 0
　+) 　　　　1 0
　　　1 1 1 0 0 0

ADDITION CONTROL SYSTEM

BACKGROUND OF THE INVENTION

1. Field of the Invention

This invention relates to an addition control system and more particularly to a system for controlling the addition (including the subtraction) of signed binary numbers expressed by N bits of the 2's complement notation. Sign control of an addend and an augend is carried out, and a corrective number (0, 1 or 2) is added to an adder circuit according to whether neither, one, or both the addend and the augend are applied to the adder circuit in the form of 1's complements, as a result of the sign control.

2. Description of the Prior Art

In the control of the addition of numbers represented with N bits of the 2's complement notation having sign bits, it is contemplated to effect the addition of an addend and an augend after their respective signed values have been sign controlled to be plus, minus, absolute value of minus of the absolute value. In certain cases, it is necessary that the addend and the augend be applied in the form of complements to a binary adder. Further, in the control of the addition of numbers represented with N bits having sign bits, it is desired to accurately detect the overflow state resulting from the addition.

In order prior art, in the case when an addition operation is to be performed after sign control, the addend and augend are transformed into N-bit numbers of the designated signs before the addition operation is performed. Consequently, many steps are required to effect the operation.

SUMMARY OF THE INVENTION

The object of this invention is to provide an addition control system which is free from the abovesaid disadvantage in the prior art. The invention is designed so that, in the case where the addend and the augend are being added, and both are applied to a carry save adder in the form of 1's complements, a corrective number 2 is applied, to thereby ensure that the result of the addition is correct.

Another object of this invention is to provide an additional control system in which the addition is carried out of the addend and augend which have a plurality of bits with the same contents as the abovesaid sign bits to thereby enable accurate detection of the overflow state.

The addition control system according to this invention is provided for the addition of signed binary numbers represented by 2's complement notation of N bits and comprises sign control circuits for sign designation of the addend and the augend and an adder circuit comprising a carry save adder and a carry proper gate adder. The adder circuit is supplied with the sign-designated addend value, the sign-designated augend value and a corrective number to accompany complementary addition. The invention is characterized in that when the addend and augend values are both applied to the adder circuit in the form of 1's complements, a number 2 is applied as the corrective number; and when only one of addend and augend values are applied to the adder circuit in the form of a 1's complement, a number 1 is applied as the corrective number. Of course, when neither of the addend or augend values are applied to the adder circuit in the form of 1's complements, no corrective number is applied.

DESCRIPTION OF THE PREFERRED EMBODIMENTS

Figure 1:
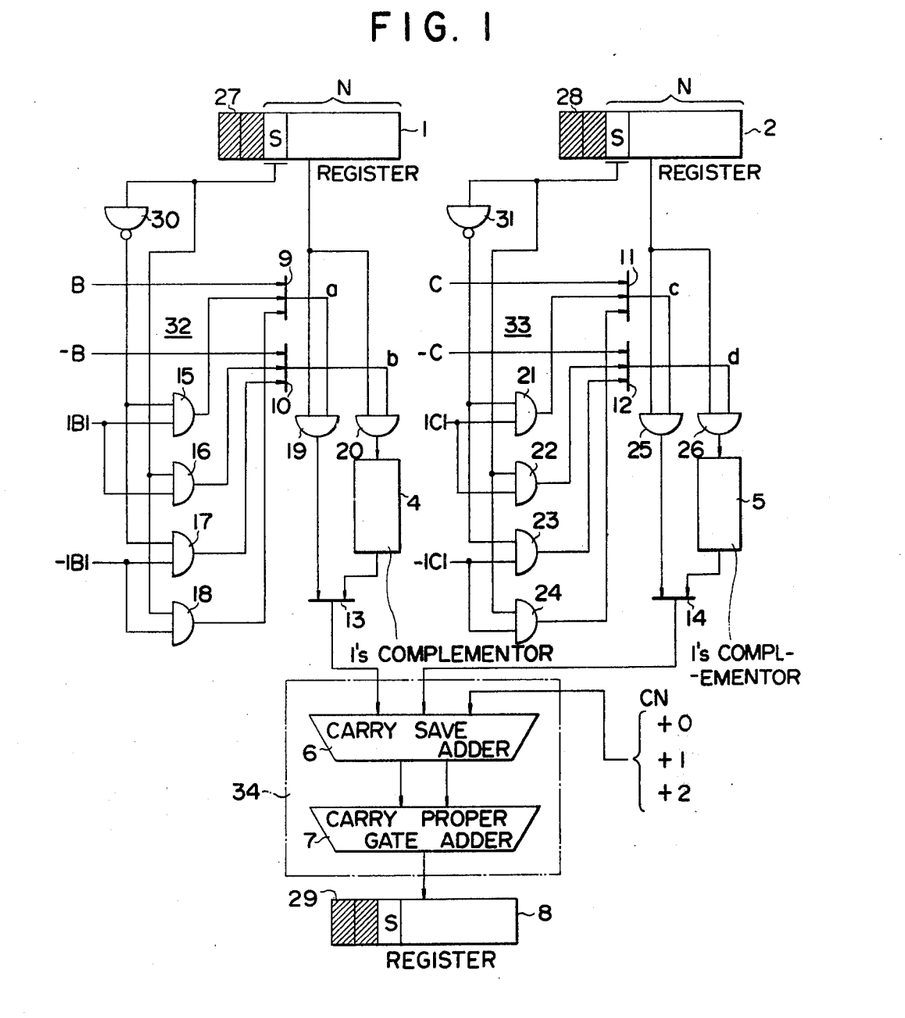
FIG. 1 is a block diagram, showing a preferred embodiment of this invention.

In FIG. 1, reference numeral 1 indicates a register for setting an augend; 2 designates a register for setting an addend; 4 and 5 respectively, identify 1's complementers; 6 denotes a carry save adder; 7 represents a carry proper gate adder; 8 shows a register for setting therein the result of an operation; 9 to 14 refer to OR gates; 15 to 26 indicate AND gates; 27, 28, and 29 designate bits for the detection of an overflow; 30 and 31 identify NAND gates; S denotes sign bits of N-bit data; 32 and 33, respectively, represent a sign control circuit composed of OR gates 9 and 10 and AND gates 15 to 18, and a sign control circuit composed of the OR gates 11 and 12 and the AND gates 21 to 24; and 34 shows an adder circuit composed of the carry save adder 6 and the carry proper gate adder 7.

In the following description, the augend and the addend are taken as B and C, respectively. In this invention, the sign of the augend B can be designated by the sign control circuit 32 to by any one of B, -B |B| or -|B| regardless of whether the augend B in the register 1 is plus or minus. The sign of the addend C can be designated by the sign control circuit 33 to be any one of C, -C, |C| or -|C| regardless of whether the addend C in the register 2 is plus or minus. The sign bit designated as S in each of the registers 1 and 2, is 0 or 1 depending upon whether the augend B and the addend C, respectively, are plus or minus (0 =+and 1 =−).

Where the augend B in register 1 is applied with the sign B to the adder circuit, the sign command signal B in FIG. 1 is a logic 1 (hereinafter referred to as "true") and the output $a$, from the OR gate 9, becomes 1. The content of the register 1 is then directly applied to the adder circuit 34 through the AND gate 19 and the OR gate 13, regardless of the S bit in the register 1.

Where the augend B in register 1 is applied with the sign -B, the sign command signal -B in "true" and the output $b$ from the OR gate 10 becomes 1. The content of the register 1 is applied to the 1's complementer 4 which produces a 1's complement of the augend B applied to the adder 34 through OR gate 13.

Where the augend B in register 1 is applied with the sign |B|, the sign command signal |B| is made true. Correspondingly, when the augend B in register 1 at that instant is plus, the sign bit S is 0 and the output from the NAND gate 30 is 1, thereby gating a 1 through AND gate 15 to OR gate 9. Accordingly, when the augend B in register 1 is plus, the output $a$ from the OR gate 9 is 1 and the AND gate 19 is thereby turned on, then the content of the register 1 is directly applied to the adder circuit 34 through OR gate 13. On the other hand, when the augend B in the register 1 is minus, the output $b$ from the OR gate 10 is 1 and the AND gate 20 is thereby turned on, then the content of the register 1 is thereby applied to the adder 35 in the form of a 1's complement.

Further, where the augend B in register 1 is applied with the sign $\pm|B|$, the sign command signal $\pm|B|$ in FIG. 1 is made true. When the augend B in the register 1 at that instant is plus, the output from the AND gate 17 is 1 and alternatively, when the augend B in register 1 is minus, the output from the AND gate 18 is 1. Accordingly, when the augend B in register 1 is plus, the output $b$ from the OR gate 10 is 1 and the AND gate 20 is turned on. The content of the register 1 is thereby applied to the adder 35 in the form of a 1's complement. Alternatively, where the augend B is minus, the output $a$ from the OR gate 9 is 1 and the AND gate 19 is turned on, causing the content of the register 1 to be applied directly to the adder 34 through OR gate 13.

Similarly, in the case of the addend C, the content of the register 2 is either directly applied or is applied in the form of a 1's complement to the adder 34, depending upon whether the output $c$ from the OR gate 11 or the output $d$ from the OR gate 12 is 1. The gating of the addend C is performed in the same manner as described above in connection with the gating of the augend B.

Figure 1A:
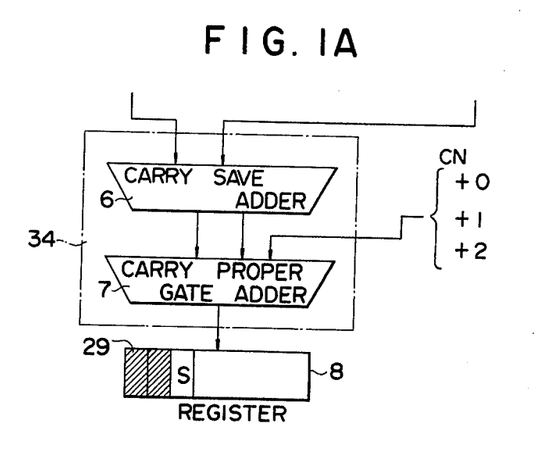
FIG. 1A is a block diagram, showing an alternative preferred embodiment of an adder circuit employed in the FIG. 1 embodiment.

Since there are some occasions when neigher, one, or both of the augend B and the addend C are applied to the adder 34 in the form of 1's complements, a corrective number CN is applied to the adder 34 having a value of 0, +1 or +2 to accompany the addition so that the result of addition may be a correct one. The corrective number CN is controlled to be 0 when neither the augend B or the addend C applied to the adder circuit 34 are in the form of 1's complements; +1 when only one of the addend B and the addend C is applied to the adder circuit 34 in the form of a 1's complement; and +2 when both the augend B and the addend C are applied to the adder circuit 34 in the form of 1's complements. The corrective number CN can be applied to the carry save adder 6 as shown in FIG. 1, but may also be applied to the carry proper gate adder 7, as shown in FIG. 1A. And the result of the operation in the adder 34 is set in the register 8.

Figure 2:
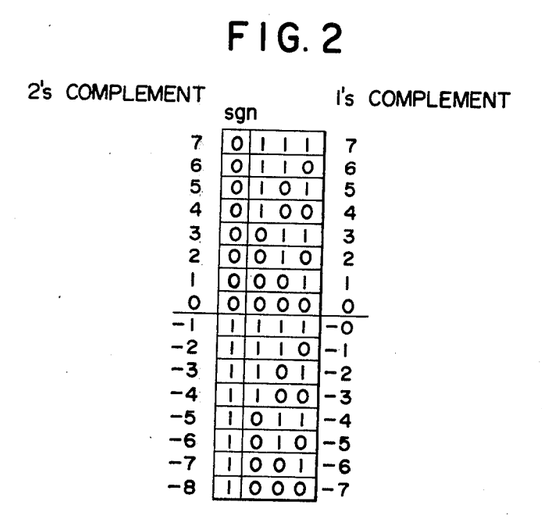
FIGS. 2, 3, 4 and 5 are explanatory of the outline of the adding process according to the present invention.

FIGS. 2 to 5 are diagrams, for explaining the principles of addition used in this invention. The augend B and the addend C set in the registers 1 and 2, respectively, are each represented with N bits of the 2's complement notation having the sign bit S. In FIG. 2, 4-bit numbers including the sign bit S are shown both in the 2's complement notation and in the 1's complement notation.

For addition including the sign bit, it is necessary to detect the presence or absence of an overflow resulting from the addition operation, thereby determining whether the result of the operation is a correct one without an overflow or one having an overflow. To this end, in this invention, additional bits are added to the addend and the augend, which will hereinafter be described.

Figure 3:
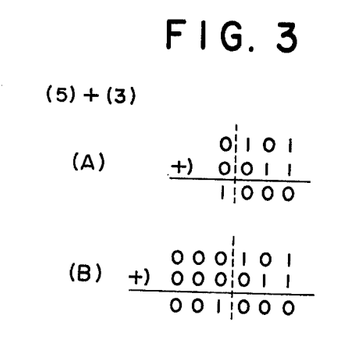
Figure 4:
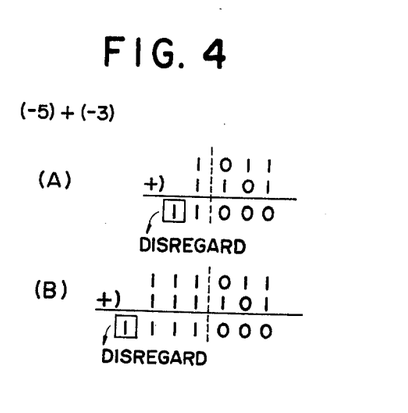

FIGS. 3 and 4 are explanatory of the principle of the detection of the overflow generation in connection with 4-bit numbers.

In such an operation of 5+3 as shown in FIG. 3, if the addition is carried out simply as shown in FIG. 3A, an overflow is caused and the result of the addition is interpreted as if it is −7. To avoid this, in the present invention, when the augend 5 is set in the register 1, the additional two bits 27 (FIG. 1) whose content is the same as the sign bit are added to the augend to express it in the binary notation form of 000101. And when the addend 3 is set in the register 2, the additional two bits 28 (FIG. 1) are similarly added to the addend to express it in the binary notation form of 000011. By doing so, the result of the addition is provided in such a form of 001000 as shown in FIG. 3B and since the three higher order bits are not all 0 or all 1, it is possible to detect the generation of an overflow.

FIG. 4 shows the case of no overflow being caused in the addition of (-5) + (-3). Also in the case where (-5) and (-3) of the 2's complement notation are simply added, as shown in FIG. 4A, the correct result -8 is obtained by disregarding the carry. In the case where the additional bits are added, as shown in FIG. 4B, the three higher order bits (disregarding the carry) are all 1 (in some cases, 0), it is possible to easily detect that the correct result without overflow is obtained.

Figure 5:
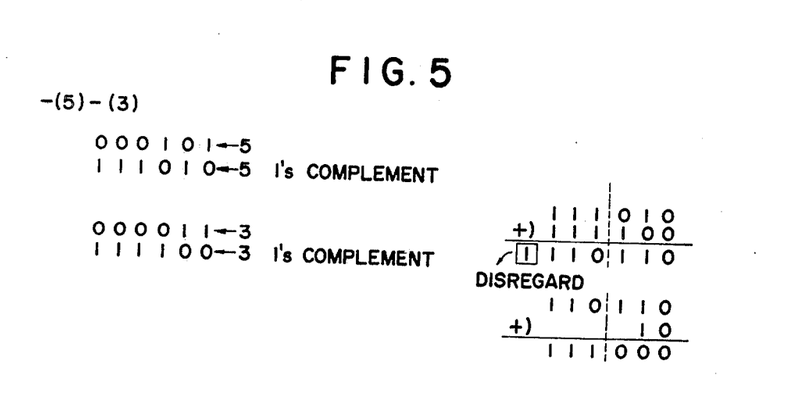

FIG. 5 is explanatory of the addition of a number 2 as a corrective number in the case where the augend B in the register 1 is applied to the adder 34 after being converted by the sign control circuit 32 into a 1's complement and the addend C is applied to the adder 34 after being converted by the sign control circuit 33 into a 1's complement.

In the case of the illustrated operation -(5) - (3) the augend B is 5 and the addend C is 3. However, the augend B is designated by the sign command signal to be -B and the addend C is designated by the sign command signal to be -C.

In the above case, the augend 5 is applied to the adder 34 after being converted by the 1's complementer 4 into the binary notation form of 111010 and the addend 3 is applied to the adder 34 after being continued by the 1's complementer 5 into the binary notation form of 111100.

If no corrective number is applied to the adder 34, the result of the addition mentioned above is 110110 (disregarding the carry). In this invention, since the augend and the addend are both applied to the adder in the form of complements, a corrective number 2 (i.e., binary number 10) is added to the abovesaid 110110 to obtain the correct result of 111000. Since the three higher order bits of the result are all 1 (or 0), it is possible to detect that no overflow has occurred.

As has been described in the foregoing, according to this invention, the addition (or subtraction) is carried out after designating the augend B and the addend C to be B, -B, |B| or -|B| and C, -C, |C| or -|C|, respectively, regardless of whether the augend and the addend in their respective registers are plus or minus. It is also possible to accurately detect whether or not an overflow has resulted from the operation.

Figure 6A:
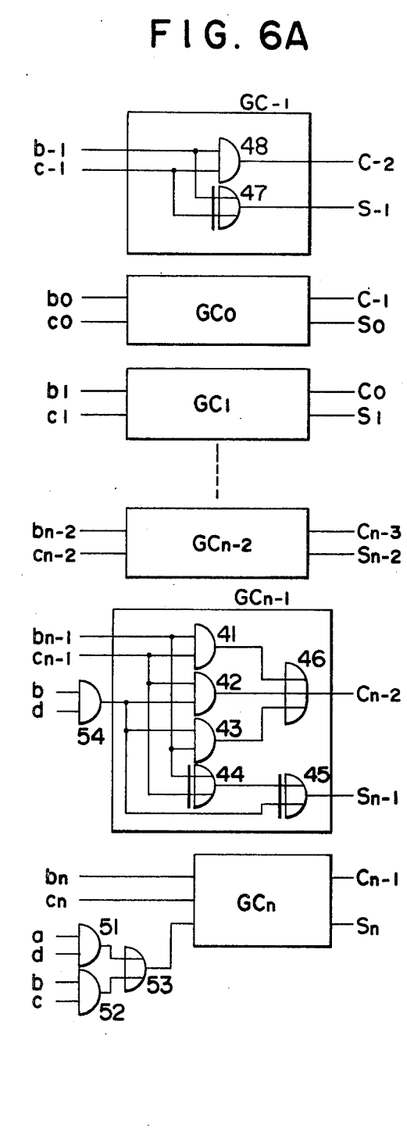
FIG. 6A shows a block diagram of the carry save adder as shown in FIG. 1.
Figure 6B:
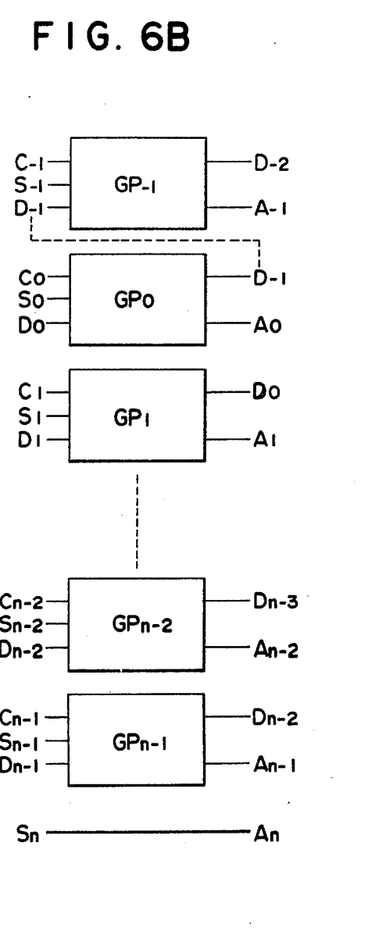
FIG. 6B shows a block diagram of the carry proper gate adder as shown in FIG. 1.

FIGS. 6A and 6B illustrate the construction of the adder 34 shown in FIG. 1. FIG. 6A shows the construction of the carry save adder, which comprises gate circuits $GC_{-1}$ and $GC_0$ to $GC_n$. The gate circuits $GC_{n-1}$ and $GC_n$ are each a three-input, two-output gate circuit which is composed of AND gates 41, 42 and 43, exclusive OR circuits 44 and 45 and an OR gate 46. The other gate circuits $GC_{-1}$ and $GC_0$ to $GC_{n-2}$ can also be formed to have the same construction as mentioned above but they are essentially of two-input, two-output, so that they are each composed of an AND gate 48 and an exclusive OR circuit 47.

AND gates 51, 52 and 54 and an OR gate 53, connected to one input of the $GC_n$ gate circuit, are provided for the formation of the corrective number CG and are supplied with the outputs $a$, $b$, $c$ and $d$ from the OR gates 9, 10, 11 and 12 in FIG. 1. As described previously, where the augend B and the addend C applied to the adder circuit 34 are both in the form of 1's complements (i.e., -B, -|B| or |B|, and -C, -|C| or |-C|) the outputs $b$ and $d$ from the OR gates 10 and 12 are both 1, so that the output from the AND gate 54 becomes 1. As a result of this, the carry save adder 6 is supplied with a binary number 10 (i.e., a corrective number 2). Reference characters $b_{-1}$, $b_0$ to $b_n$ and $c_{-1}$, $c_0$ to $c_n$ indicate bits of the augend B and the addend C, respectively; and $b_1$ and $c_1$ designate sign bits, $b_0$, $b_{-1}$, $c_0$ and $c_{-1}$ show the case where the additional bits are two. The outputs $c_{-2}$, $c_{-1}$ and $c_0$ to $c_{n-1}$ from the gate circuits $GC_{-1}$ and $GC_0$ to $GC_n$ are indicative of the carry and their outputs $S_{-1}$ and $S_0$ to $S_n$ are outputs of sum.

FIG. 6B illustrates the construction of the carry proper gate adder 7 (shown in FIG. 1), which is composed of gate circuits $GP_{-1}$ and $GP_0$ to $GP_{n-1}$. Each of the gate circuits $GP_{-1}$ and $GP_0$ to $GP_{n-1}$ is a three-input, two-output gate circuits of the same construction as the aforesaid gate circuits $GC_{n-1}$ and $GC_n$. The carry proper gate adder is connected to the carry save adder of FIG. 6A, with their corresponding outputs and inputs (of the same reference characters) being interconnected as indicated by dotted lines. The outputs $A_{-1}$ and $A_0$ to $A_n$ of the carry proper gate adder are set in the register 8. The outputs $D_{-2}$, $D_{-1}$ and $D_0$ to $D_{n-2}$ each indicated carry. Consequently, the output $A_1$ is the sign bit S set in the register 8 and the outputs $A_{-1}$ and $A_0$ are the additional bits 29 set in the register 8. The three bits of the outputs $A_{-1}$, $A_0$ and $A_1$, indicate the presence or absence of overflow.

Figure 7A:
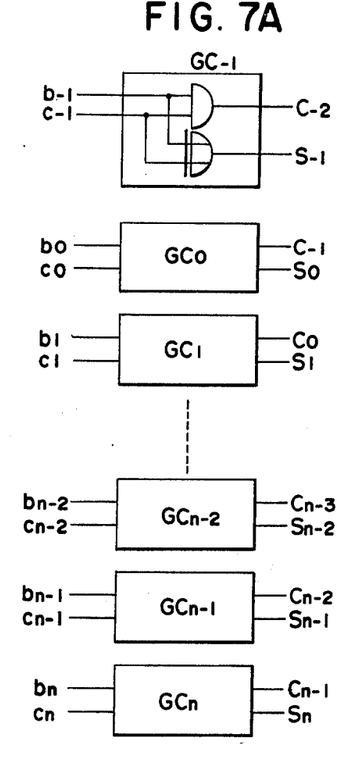
FIG. 7A shows a block diagram of the carry save adder as shown in FIG. 1A.
Figure 7B:
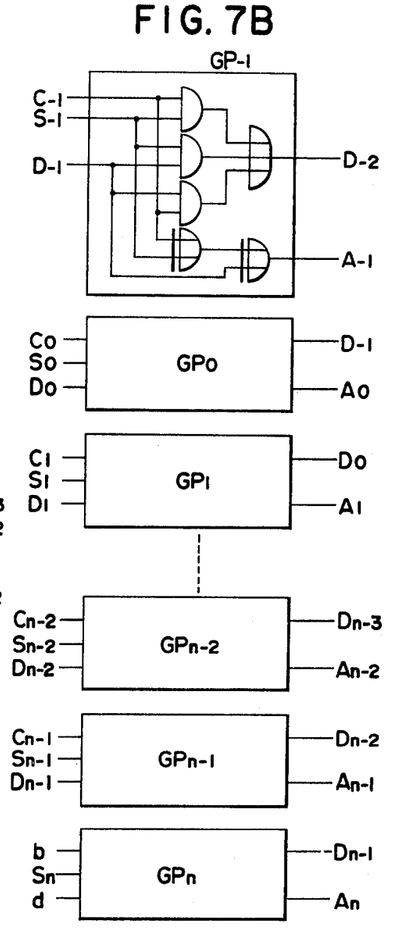
FIG. 7B shows a block diagram of the carry proper gate adder as shown in FIG. 1A.

In the above example, the corrective number CN is applied to the carry save adder but it may also be applied to the carry proper gate adder as shown in FIG. 1A. The carry save adder and the carry proper gate adder in such a case are illustrated in FIGS. 7A and 7B. Namely, the carry save adder is composed of two-input, two-output gate circuits $GC_{-1}$ and $GC_0$ to $GC_n$ and the carry proper gate adder is composed of three-input, two-output gate circuits $GP_{-1}$ and $GP_0$ to $GP_n$. In the case where the gate circuit $GP_n$ is supplied with the outputs $b$ and $d$ from the OR gates 10 and 12 in FIG. 1 and the augend B and the addend C are both applied in the form of 1's complements, the outputs $b$ and $d$ are both 1, so that the carry proper gate adder is supplied with binary number 10 (i.e., corrective number 2). If only one of the $b$ and $d$ outpus from the OR gates 10 and 12 in FIG. 1 are 1, the carry proper gate adder is supplied with a binary number 01 (i.e., corrective number 1). Of course, if neither of the $b$ and $d$ outputs from the OR gates 10 and 12 in FIG. 1 are 1, (i.e. B, |B| or -|-B| and C, |C| or -|-C| ) no corrective number is applied to the carry proper gate adder.

Where the additional bits are two, the overflow generation can be detected depending upon whether the three bits of the outputs $A_{-1}$, $A_0$ and $A_1$ from the gate circuits $GP_{-1}$, $GP_0$ and $GP_1$ are all 1, all 0 or not.

A comparison of the circuit units shown in FIGS. 6 and 7 indicates that the adder circuit of FIG. 6 requires more kinds of circuit units than that shown in FIG. 7, which employs only two kinds of circuit units. Hence, the configuration of FIG. 7 may be economically more advantageous than the former.

It will be apparent that many modifications and variations may be effected without deparing from the scope of the novel concepts of this invention. Therefore, it is intended by the appended claims to cover all such modifications and variations which fall within the true spirit and scope of the invention.

What is claimed:

1. A system for controlling the addition of an addend number and an augend number, wherein each number is represented with N-bits, including a sign bit, in a 2's complement notation, said system comprises: a sign control circuit means for designating the sign of the respective addend and augend in response to addend sign command signals and augend sign command signals; an adder circuit means for receiving said sign designated addend and augend from said sign control circuit means and producing an output which is a sum of the sign designated addend and sign designated augend; wherein said adder circuit means comprises a carry save adder circuit, a carry proper gate adder circuit and a corrective number gate circuit, which corrects said sum according to the condition of said sign designated addend and said sign designated augend being respectively received by the adder circuit means in the form of 1's complements.

2. The system according to claim 1, wherein said corrective number circuit applies said corrective number to an input of said carry save adder circuit.

3. The system according to claim 1, wherein said corrective number circuit applies said corrected number to an input of said carry proper gate adder circuit.

4. The system according to claim 1, wherein said sign control circuit means includes an addend part and an identical augend part.

5. The system according to claim 4, wherein said addend part gates said addend number directly to said adder circuit means when said addend sign command signal designates a plus.

6. The system according to claim 4, wherein said addend part gates said addend number directly to said adder circuit means when said addend sign command signal designates an absolute value and said sign bit of said addend number indicates a plus.

7. The system according to claim 4, wherein said addend part gates said addend number directly to said adder circuit means when said addend sign command signal designates a negative absolute value and said sign bit of said addend number represents a negative.

8. The system according to claim 4, wherein said addend part applies a 1's complement of said addend number to said adder circuit means when said addend sign command signal designates a minus.

9. The system according to claim 4, wherein said addend part applies a 1's complement of said addend number to said adder circuit means when said addend sign command signal designates an absolute value and said sign bit of said addend number represents a negative.

10. The system according to claim 4, wherein said addend part applies a 1's complement of said addend number to said adder circuit when said addend sign command signal designates a minus absolute value and said sign bit of said addend number represents a positive.

11. The system according to claim 1, wherein said sign control circuit means includes a first gating means for gating said addend directly to said adder circuit means, said first gating means responsive to a first signal generated in response to said addend sign command signal designating a plus, said addend sign command signal designating an absolute value and said sign bit of said addend number a positive, or said addend sign command signal designating a negative absolute value and said sign bit of said addend number representing a negative; said sign control circuit means further includes a second gating means and a 1's complementor serially connected to apply a 1's complement of said addend number to said adder circuit means in response to a second signal generated in response to said addend sign command signal designating a minus, said addend signal command signal designating an absolute value and said sign bit of said addend numer representing a negative, or said addend sign command signal designating a negative absolute value and said sign bit of said addend number representing a positive.

12. The system according to claim 1, wherein said addend number and said augend number contain additional bits which are the same as the contents of said respective sign bits; the presence of an overflow is detected at the output of said adder circuit means when said additional bits have contents different than said sign bit of said sum.

* * * * *

UNITED STATES PATENT AND TRADEMARK OFFICE
CERTIFICATE OF CORRECTION

PATENT NO. : 3,976,866

DATED : August 24, 1976

INVENTOR(S) : Masanori Motegi et al

Page 1 of 3

It is certified that error appears in the above-identified patent and that said Letters Patent are hereby corrected as shown below:

In the Abstract, "(0, 1 or 2)" should be --("0", "1" or "2")--.

Column 1, line 11, "(0, 1 or 2)" should be --("0", "1" or "2")--

Column 1, line 29, delete "order" and substitute --the--.

Column 1, line 43, "2" should be --"2"--.

Column 1, line 64, "2" should be --"2"--.

Column 1, line 67, "1" should be --"1"--.

Column 2, line 47, "0 or 1" should be --"0" or "1"--.

Column 2, line 49, "(0=+ and 1=-)" should be --("0"=+ and "1"=-)--.

Column 2, line 52, "1" should be --"1"--.

Column 2, line 53, "1" should be --"1"--; "a" should be --a--.

Column 2, line 59, "1" should be -- "1" --.

Colunn 2, line 64, "true" should be --"true"--.

Column 2, line 66, "0" should be --"0"--.

Column 2, line 66, "1" should be --"1"-- (both occurrences).

Column 3, line 1, "1" should be -- "1" --.

Column 3, line 6, "1" should be -- "1" --.

Column 3, line 12, "true" should be --"true"--.

Column 3, line 14, "1" should be --"1"--.

Column 3, line 15, "1" should be --"1"--.

Column 3, line 17, "1" should be -- "1" --.

Column 3, line 21, "1" should be -- "1" --.

UNITED STATES PATENT AND TRADEMARK OFFICE
CERTIFICATE OF CORRECTION

PATENT NO. : 3,976,866

DATED : August 24, 1976

INVENTOR(S) : Masanori Motegi et al

It is certified that error appears in the above-identified patent and that said Letters Patent are hereby corrected as shown below:

Column 3, line 28, "1" should be -- "1" --.
Column 3, line 32, "neigher" should be --neither--.
Column 3, line 38, "0" should be --"0"--.
Column 3, line 40, "+1" should be --"+1"--.
Column 3, line 43, "+2" should be --"+2"--.
Column 4, line 8, "000101" should be --"000101"--.
Column 4, line 11, "000011" should be --"000011"--.
Column 4, line 13, "001000" should be --"001000"--.
Column 4, line 14, "1" should be --"1"--; "0" should be --"0"--.
Column 4, line 23, "1" should be --"1"--; "0" should be --"0"--.
Column 4, line 25, "2" should be --"2"--.
Column 4, line 39, "111010" should be --"111010"--.
Column 4, line 42, "111100" should be --"111100"--.
Column 4, line 44, "110110" should be --"110110"--.
Column 4, line 47, "2" should be --"2"--.
Column 4, line 48, "10" should be --"10"--.
Column 4, line 48, "110110" should be --"110110"--.
Column 4, line 49, "111000" should be --"111000"--.
Column 4, line 50, "(or 0)" should be --(or "0")--.

UNITED STATES PATENT AND TRADEMARK OFFICE
CERTIFICATE OF CORRECTION

PATENT NO. : 3,976,866
DATED : August 24, 1976
INVENTOR(S) : Masanori Motegi et al Page 3 of 3

It is certified that error appears in the above-identified patent and that said Letters Patent are hereby corrected as shown below:

Column 5, line 13, "1" should be --"1"--.
Column 5, line 14, "1" should be --"1"--.
Column 5, line 15, "10" should be --"10"--.
Column 5, line 16, "2" should be --"2"--.

Column 5, line 53, "1" should be -- "1" --.
Column 5, line 55, "10" should be --"10"--; "2" should be --"2--.

Column 5, line 57, "1" should be --"1"--.
Column 5, line 58, "01" should be --"01"--.
Column 5, line 59, "1" should be --"1"--.
be --b and d--.
Column 5, line 60, "1" should be --"1"--;
Column 5, line 66, "1" should be --"1"--; "0" should be --"0"--.

Signed and Sealed this

Fourteenth Day of December 1976

[SEAL]

Attest:

RUTH C. MASON
Attesting Officer

C. MARSHALL DANN
Commissioner of Patents and Trademarks